(12) United States Patent
Ukpai et al.

(10) Patent No.: US 7,648,118 B2
(45) Date of Patent: Jan. 19, 2010

(54) FLOW-REGULATING VALVE AND OIL LEVEL CONTROL SYSTEM USING SAME

(75) Inventors: Ukpai I. Ukpai, West Bloomfield, MI (US); Norman K. Bucknor, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 310 days.

(21) Appl. No.: 11/669,992

(22) Filed: Feb. 1, 2007

(65) Prior Publication Data

US 2008/0185541 A1 Aug. 7, 2008

(51) Int. Cl.
*F16K 31/00* (2006.01)
*F16K 31/18* (2006.01)

(52) U.S. Cl. ............... 251/11; 251/129.01; 251/129.06
(58) Field of Classification Search ............... 251/11, 251/291.01, 129.06
See application file for complete search history.

(56) References Cited

U.S. PATENT DOCUMENTS

| | | | |
|---|---|---|---|
| 4,372,486 A * | 2/1983 | Tomioka et al. | 236/92 B |
| 5,427,138 A * | 6/1995 | Ochiai et al. | 137/468 |
| 5,865,418 A * | 2/1999 | Nakayama et al. | 251/11 |
| 6,279,869 B1 * | 8/2001 | Olewicz | 251/7 |
| 6,326,707 B1 | 12/2001 | Gummin et al. | |
| 6,762,515 B2 | 7/2004 | Gummin et al. | |
| 6,834,835 B1 | 12/2004 | Knowles et al. | |
| 7,112,156 B2 | 9/2006 | Maguire | |
| 2004/0256920 A1 | 12/2004 | Gummin et al. | |

OTHER PUBLICATIONS

Darel E. Hodgson et al., Using Nitinol Alloys, 20000, Shape Memory Applications, Inc., pp. 15-25.
Nanomuscle Actuator User Guide, Nov. 29, 2001, Nanomuscle, Inc., pp. 15-18.
D. Stoeckel, Shape-Memory Alloys Prompt New Actuator Designs, Advanced Materials & Processes, Jan. 1, 1991, Issue 138, (4), ASM International, USA.

\* cited by examiner

*Primary Examiner*—John K Fristoe, Jr.

(57) ABSTRACT

A flow-regulating valve has at least one active material component that may be passively activated (e.g., in response to changes in surrounding temperature) to control fluid flow through the valve. Additionally, an actuator, which may be of any type, such as a solenoid or even another active material component, actuates due to active activation, such as resistive heating in response to a sensor/control signal, which could be due to external conditions (such as existence of high acceleration) or internal conditions (such as change in fluid temperature) to provide an active level of control of fluid flow through the valve. The flow-regulating valve may be used in an oil level control system of a transmission to ensure adequate oil availability during various operating conditions while minimizing the adverse effects such as spin and windage losses. Similar applications can be made in other fluid flow or fluid level control systems.

13 Claims, 3 Drawing Sheets

FLOW-REGULATING VALVE AND OIL LEVEL CONTROL SYSTEM USING SAME

TECHNICAL FIELD

The invention relates to a flow-regulating valve and an oil level control system for a transmission having the flow-regulating valve.

BACKGROUND OF THE INVENTION

Many applications requiring regulated fluid flow utilize valves that open different amounts in response to one or multiple factors. Such a valve may be actively controlled via an electronic controller. Alternatively, passive control is sometimes possible, such as with a valve having a thermostatic element that varies its opening with changes in fluid temperature.

One application that has utilized flow control valves is a vehicle transmission. Vehicle transmissions typically have rotating parts that require constant lubrication. A certain level of fluid is required to be maintained in the transaxle in order to ensure a proper operation of its hydraulic system. The fluid circuit often includes one or more pumps located within the side cover attached to a main housing with a suction inlet coming from the sump formed by a bottom pan. The oil level in the sump must be high enough to ensure that the pump has adequate suction, especially during extreme cold temperatures or certain maneuvers such as high acceleration turns that could cause the fluid to move away from the pump suction during the condition or turn. At the same time, it is desirable to keep the oil level as low as possible to reduce spin and windage losses associated with excess fluid in the rotating parts of the transmission. Generally, fluid flow increases with increasing temperature, so valves that gradually close with increasing temperature have been used to control the oil level in the bottom pan. However, with these valves, some minimum oil level, which is not optimal for reducing spin and windage losses, must always be present so that adequate oil is present at the pump even in the event that outside forces or conditions, such as a high g-force turn, shifts the bulk of the oil in the bottom pan away from the pump suction.

SUMMARY OF THE INVENTION

A flow-regulating valve is provided that uses at least one active material component that may be activated to actuate the active material component (i.e., change some dimensional characteristic of the active material component) to control fluid flow through the valve. The active material component is activated passively, preferably by the surrounding ambient temperature, and actuates over a period of time beginning at a predetermined transformation temperature to control movement of one or more members of the valve and thus the alignment of openings in the members to control fluid flow through the valve. Preferably, several moveable members are arranged to provide movement in a telescoping manner with respect to one another in response to the passive activation of respective active material components connected with the movable members. Additionally, an actuator, which may be of any type, such as a solenoid or even another active material component, is actively actuated, such as through resistive heating, for instance in the case of using a smart material actuator, in response to a control signal, to provide an active level of control of fluid flow through the valve. The resistive heating may be in response to a control signal, for instance, in the case where the active material component is a smart material actuator. Active activation allows a more fine-tuned control of valve actuation speed than if valve actuation were based on passive activation alone and also allows the state of a set or sets of active material components to be changed to a state different from that at ambient. For example, active activation via a control signal from a controller allows the valve to open or close more quickly in response to one or more predetermined conditions than it would based on the passive activation (e.g., due to a change in surrounding temperature) alone.

Specifically, a flow-regulating valve is provided that includes a plurality of members including a first member and a second member. Each of the members has at least one different opening extending therethrough. A first active material component is connected to the first member. The first active material component is characterized by a first transformation temperature at which the active material component begins to actuate to move the first member with respect to the second member (i.e., from a first position to a second position) such that fluid communication between the respective different opening is altered (i.e., is varied or changed). The flow-regulating valve further includes an actuator that is connected to the first member. The actuator is actuatable upon occurrence of the first predetermined condition to move the first member with respect to the second member (e.g. to a third position) such that fluid communication between the respective different openings is further altered during the first predetermined condition.

In one aspect of the invention, an oil level control system for a transmission is provided. In such a system, torque-transmitting components contained in a housing of the transmission may be provided with lubricating and cooling fluid via a pump located, oftentimes, within a portion of the housing referred to as a side cover. A controller is operable to determine the occurrence of the predetermined condition and send a control signal (e.g., if the actuator is an active material component, an activation signal, such as an electric current which activates the active material). A flow-regulating valve is openable and closable to alter fluid communication therethrough. The flow-regulating valve is configured to move from an open position to a closed position as fluid temperature increases. The flow-regulating valve is operatively connected to the controller and is also configured to change position upon receipt of the control signal regardless of fluid temperature. The first predetermined condition may be acceleration at or above a predetermined level. For instance, the predetermined condition may be high g-forces during turning of a vehicle, causing the fluid in the bottom pan to be moved away from the pump inlet, thereby causing the pump to lose suction and get air into the transmission fluid circuit. In this instance, the flow-regulating valve increases the level of fluid in the sump by increasing the opening of the valve during the turn. The action to open the valve can be directly from a sensor or other estimation methods. Such an oil level control system thus ensures adequate fluid to the pump even during such acceleration. The controller may also be operable to determine the occurrence of different or additional predetermined conditions, and to cause the valve to open or close when any of these conditions occur, thereby varying flow through the valve (either increasing or decreasing flow) in response to the predetermined condition.

In one aspect of the invention, the actuator may be a second active material component that actuates in response to activation via an active means such as resistive heating. Additionally, at least some of the members are movable in telescoping relationship with one another and with respect to the second member. Generally, the second member is fixed, though not necessarily. Both members can be movable in opposite directions with the relative movement providing the required change in flow through the valve.

In one embodiment, the first active material component is connected between a third and a fourth of a plurality of members. The second active material component, which is actuatable in response to resistive heating, is connected between the first member and the third member. The first member is movable in telescoping relationship with respect to the third and fourth members. The third member is movable in telescoping relationship with the fourth member. Thus, the third and fourth members may be considered a telescoping active material assembly that is positioned with respect to the first and second members to move the first member, thus providing regulation of flow through the valve.

In another embodiment, different movable members each have openings therethrough and move with respect to the second fixed member to provide a regulated flow. Specifically, the plurality of members includes a third member and a fourth member that is fixed. The first active material component, e.g., the component that is passively activated by surrounding temperature to actuate at a first transformation temperature, is connected between the third member and the fourth member. The second active material component, e.g., an active material component that is actively actuated such as by resistive heating in response to a predetermined condition, is connected between the first member and the third member. The third member engages the first member to cause the first member to move with the third member when the first active material component actuates. Thereafter, upon occurrence of the predetermined condition, the first member moves telescopically within the third member when the second active material component is actively actuated in response to resistive heating.

In another aspect of the invention, a connector may be connected with the first member and connect the first and second active material components with the first member. The connector allows the active material components to be located remotely from the movable members that have the flow-regulating respective openings.

In another aspect of the invention, the actuator may be a solenoid or any other type of mechanical or electrical actuator in lieu of an active material component.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
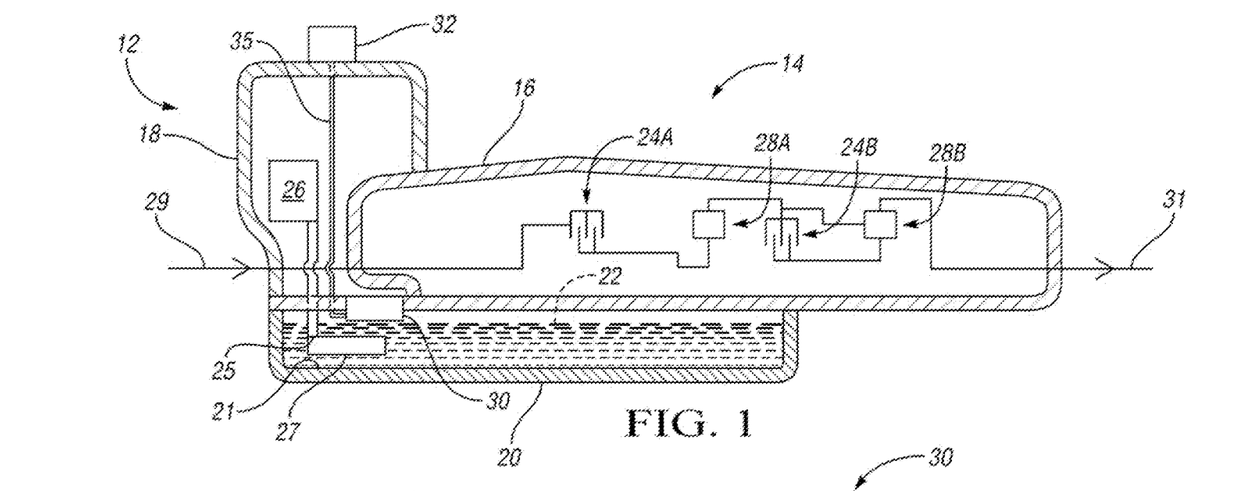
FIG. 1 is a schematic perspective illustration of a transmission with an oil level control system.

Referring to the drawings, wherein like reference numbers refer to like components, a transmission 10 of FIG. 1 includes an oil level control system 12. The transmission 10 includes a housing 14, also commonly referred to as the transmission casing. The housing 14 includes a portion referred to as a main casing 16 and a portion referred to as a side cover 18. A bottom pan 20 is fixed to a lower portion of the housing 14. The bottom pan 20 forms a sump 21 to contain fluid 22 that is provided to torque-transmitting components 24A, 24B, via a fluid circuit maintained by a pump 26 mounted within the side cover 18. The pump 26 may be positioned elsewhere within the scope of the invention assuming that there is a fluid connection between the fluid 22 and the pump 26. The pump suction inlet 25 is open to the sump 21 in the bottom pan 20 from which fluid is taken (through a filter 27) and distributed through the rest of the fluid circuit. Some leakage occurs between the bottom pan 20 and the housing 14 of the torque-transmitting components 24A, 24B but, for the most part, the side cover 18 acts as the fluid reservoir. The pump 26 is located within the side cover 18. An inlet to the sump 21 from the side cover 18 is via a flow-regulating valve 30. The torque-transmitting components 24A, 24B experience different levels of fluid depending on the level of the fluid 22 in the sump 21 through openings that link the sump 21 and the chamber of the main casing 16 where the torque-transmitting components 24A, 24B are located. The relative positioning of torque-transmitting components 24A, 24B and gear sets 28A, 28B in FIG. 1 is shown for purposes of illustration only. The torque-transmitting components 24A, 24B are selectively engagable to transfer torque from a transmission input member 29 to a transmission output member 31. Many other gearing arrangements and types of transmissions may be utilized within the scope of the invention. The fluid 22 in the housing 14 is then returned to the bottom pan 20, with the main avenue of fluid flow being through the flow-regulating valve 30.

The fluid level within the bottom pan 20 is regulated by fluid flow through the flow-regulating valve 30 from the fluid contained within the side cover 18. A controller 32 is connected to the flow-regulating valve 30. The controller 32 may be an existing transmission controller or alternatively may be a body module controller or an engine controller located remotely from the transmission 10 but in operative communication with the flow-regulating valve 30. The controller 32 controls opening of the valve 30 to ensure that the level of the fluid 22 in the bottom pan 20 provides adequate fluid supply to the pump 26 during certain vehicle operating conditions such as high acceleration turns. The controller 32 is operable to determine the existence of a predetermined condition such as the high g-force turn using, for instance, sensors located at various vehicle or transmission locations, and then to provide a control signal via a control signal connection 35 to the flow-regulating valve 30 to open the valve 30 further during such predetermined conditions.

At all times other than when the predetermined condition or conditions are occurring, the flow-regulating valve 30 is opened an amount that is dependent upon ambient temperatures. The flow-regulating valve 30 is opened a greater amount during cold ambient temperatures and a lesser amount (or completely closed) during high ambient temperatures, as the fluid 22 may increase in volume at such high temperatures. The temperature-based opening of the valve 30 is passively controlled using at least one active material component while the controller 32 provides active control through an actuator or another active material component. Various embodiments of flow-regulating valves that provide such a combination of passive and active control are described below. It should be appreciated that as alternatives to having the flow-regulating valve 30 open passively and then close by active means under certain predetermined conditions, the valve could be controlled to establish a different sequence of opening and closing and also may be controlled to open and/or close in response to different predetermined conditions. Different combinations of active and passive means may affect the movement, depending on the active material and/or actuator being used. For example, a solenoid could be used to move the valve, as described herein. One or more active material components could be responsive to different predetermined conditions to vary fluid flow through the valve in response to the occurrence of the different predetermined conditions.

First Embodiment of a Flow-Regulating Valve

Figure 2A:
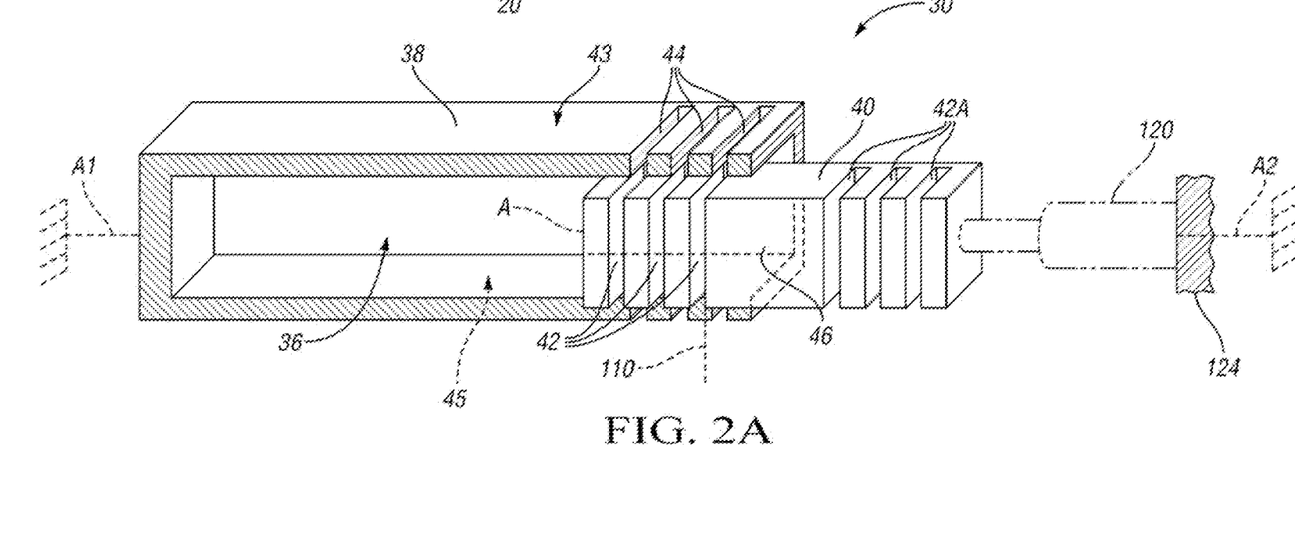
FIG. 2A is a first portion of a first embodiment of a flow-regulating valve within the scope of the invention.
Figure 2B:
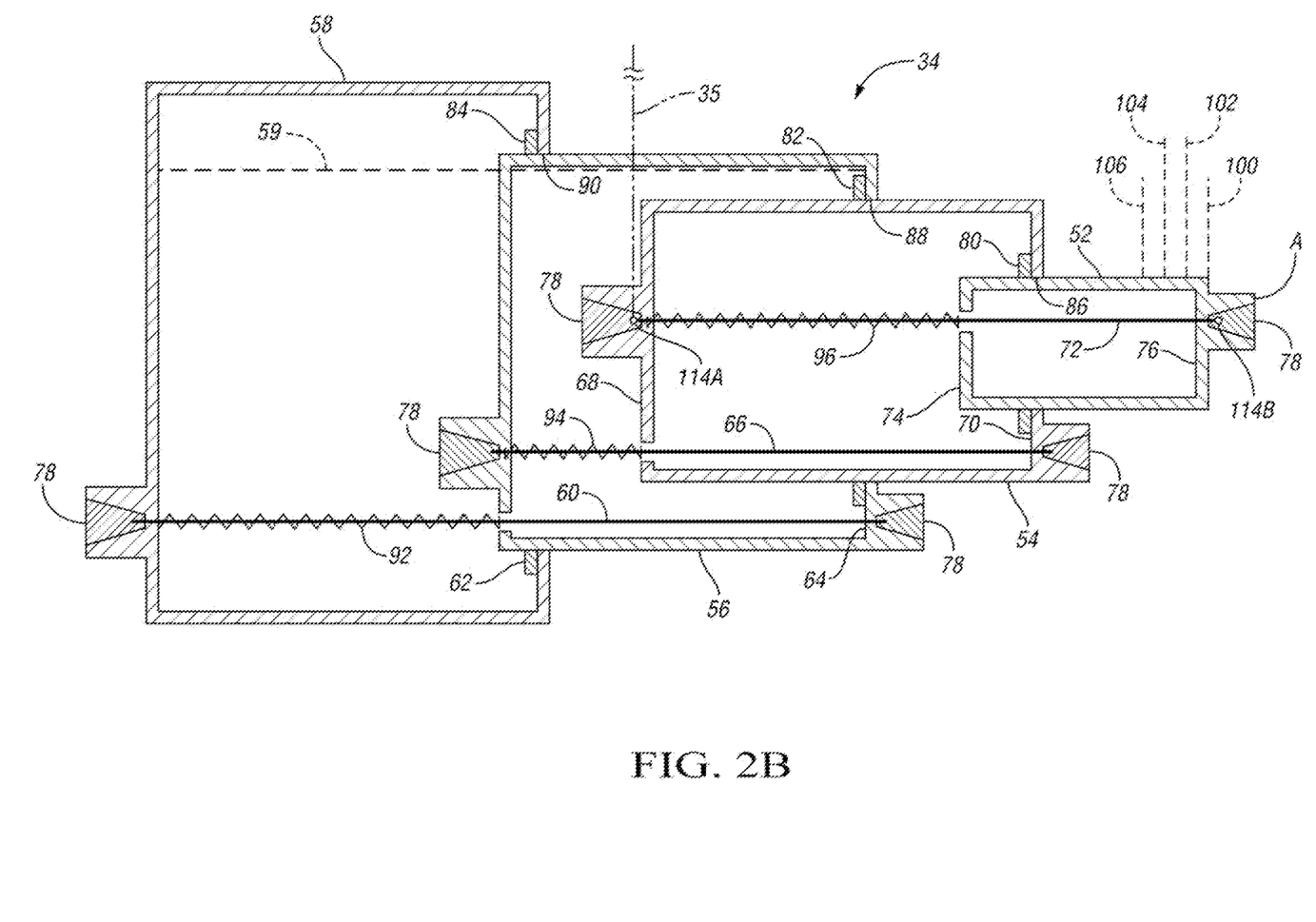
FIG. 2B is a second portion of the flow-regulating valve that connects with the first portion of FIG. 2A at the surface A indicated in both FIG. 2A and FIG. 2B.

Referring to FIGS. 2A and 2B, a first embodiment of the flow-regulating valve 30 is shown. The portion of the flow-regulating valve 30 shown in FIG. 2B is a telescoping active material actuator portion 34 that connects with the portion shown in FIG. 2A at the surface labeled A in both FIGS. 2A and 2B, with the telescoping actuator portion 34 preferably sized to fit within the cavity 36 formed within a fixed member 38 (also referred to herein as the second member).

Referring to FIG. 2A, the valve 30 includes a first, movable member 40 that is positioned for telescoping movement within the second, fixed member 38 due to actuation of the telescoping active material actuator portion 34. The fixed member 38 has a hollow rectangular shape and the movable member 40 has a solid rectangular shape sized to fit within the hollow portion of the fixed member 38. Within the scope of the invention, the fixed member 38 and movable member 40 may have many other coordinating shapes.

The first member 40 has a first set of openings 42 that are shown in FIG. 2A in a first position of the first member 40 such that the openings 42 are aligned with a respective set of openings 44 formed through the body of the second member 38. The dimensions of the openings 42, 44 depend upon the space available for the flow-regulating valve 30, as well as other transmission-dependent parameters, such as pump suction rate and pressure rating. The openings appear as slots; however, within the scope of the invention, a flow-regulating valve could be a spool-type valve, with the movable member being the spool and the fixed member being a spool body. The second member 38 is generally hollow to allow telescoping longitudinal movement of the first member 40 and the telescoping actuating portion 34. The openings 44 are thus at a top and a bottom of the fixed member 38, as shown in FIG. 2A. Fluid flow through the flow-regulating valve 30 is from fluid generally above the top surface 43 of the valve downward through the openings 44 to the sump formed by the bottom pan 20 of the FIG. 1 which is located below a bottom surface 45 of the valve 30. Preferably, the flow-regulating valve 30 is designed such that the openings 42 and 44 are aligned when ambient temperature is relatively low, to allow fluid flow to the bottom pan 20 shown in FIG. 1. However, as ambient temperature increases, the transformation temperature or temperatures of active material components within the telescoping actuator portion 34 are reached, causing actuation of the respective active material components, which in turn causes the first member 40 to be pulled to the left in FIG. 2A such that a solid portion 46 of the first member 40 is aligned with the openings 44 in a second fixed member 38 to substantially prevent fluid flow through the flow-regulating valve 30.

As an alternative to the telescoping active material actuator portion 34, relative movement of the first member 40 and the second member 38 may be achieved by attaching a single active material component, such as a wire, a set of active material components or a telescoping actuator to opposite ends of the first and second members 40, 38, as represented by the active material components A1 and A2 illustrated in phantom in FIG. 2A, with each grounded to a stationary member. In such an embodiment, the second member 38 would be movable with respect to the first member 40, rather than fixed. The active material component A2 could be passively activated and A1 could be actively actuated.

A number of exemplary embodiments of flow-regulating valves within the scope of the invention are described herein. The flow-regulating valves all utilize at least one active material component that may be, but is not limited to, a class of active materials called shape memory materials. Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. For convenience and by way of example, reference herein will be made to shape memory alloys and shape memory polymers. The shape memory ceramics, baroplastics, and the like can be employed in a similar manner as will be appreciated by those skilled in the art in view of this disclosure. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application of external stimuli has led to their use in actuators to apply force resulting in desired motion. Smart material actuators offer the potential for a reduction in actuator size, weight, volume, cost and noise in comparison with traditional electromechanical and hydraulic means of actuation.

SMAs

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is often called the austenite finish temperature ($A_f$). As used herein, "transformation temperature" refers to the austenite start temperature. When the shape memory alloy is in the austenite phase and is cooled, it begins to change into the martensite phase, and the temperature at which this phenomenon starts is often referred to as the martensite start temperature ($M_s$). The temperature at which austenite finishes transforming to martensite is often called the martensite finish temperature ($M_f$). The range between $A_s$ and $A_f$ is often referred to as the martensite-to-austenite transformation temperature range while that between $M_s$ and $M_f$ is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below $A_s$). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100 degrees Celsius to below about −100 degrees Celsius. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase, a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses which can be as high as the inherent yield strength of the austenite material, sometimes up to three or more times that of the deformed martensite phase. For applications that require a large number of operating cycles, a strain in the range of up to 4% or more of the deformed length of wire used can be obtained. In experiments performed with Flexinol® wires of 0.5 mm diameter, the maximum strain in the order of 4% was obtained. This percentage can increase up to 8% for thinner wires or for applications with a low number of cycles.

SMPs

As previously mentioned, other suitable shape memory materials are shape memory polymers (SMPs). "Shape memory polymer" generally refers to a polymeric material, which exhibits a change in a property, such as a shape, a dimension, a shape orientation, or a combination comprising at least one of the foregoing properties in combination with a change in its elastic modulus upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature ($T_g$), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

EAPs

The active material may also comprise an electroactive polymer (EAP) such as ionic polymer metal composites, conductive polymers, piezoelectric polymeric material and the like. As used herein, the term "piezoelectric" is used to describe a material that mechanically deforms when a voltage potential is applied, or conversely, generates an electrical charge when mechanically deformed Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer is a piezoelectric poly (vinyldene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used for electrodes may vary. Suitable materials used in an electrode may include graphite, carbon black, colloidal suspension, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

SMCs/Piezoelectric

The active material may also comprise a piezoelectric material. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for Thin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly(metharcylic acid ("PMA"), and their derivatives; polyureas, and their derivatives; polyerethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, T, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof, and Group VIA and IIB compounds, such as CdSe, CdS, GaAs, $AgCaSe_2$, ZnSe, GaP, InP, ZnS and mixtures thereof.

MR Elastomers

Suitable active materials also comprise magnetorheological (MR) compositions, such as MR elastomers, a class of smart materials whose rheological properties can rapidly change upon application of a magnetic filed. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop their structure when exposed to a magnetic field in as little as a few milliseconds. Discontinuing the exposure of the MR elastomers to the magnetic field reverses the process and the elastomer returns to its lower modulus state. Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

MSMAs

Magnetic Shape Memory Allows (MSMAs) are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

Exemplary Embodiment of Telescoping Active Material Actuator Portion of Flow-Regulating Valve Referring to FIG. 2B, the active material actuator portion 34 of flow-regulating valve 30 has multiple movable members 52, 54 and 56 and a fixed anchor member 58. Movable member 54 is referred to in the claims as the third member and movable member 56 is referred to as the fourth member. The movable members 52, 54 and 56 are preferably concentric bodies, which in cross-section may be circular, rectangular, triangular or any other shape, and are arranged in a "telescoping manner" such that movable member 52 is able to move at least partially in and out of movable member 54, which can move at least partially in and out of movable member 56, which can move at least partially in and out of anchor member 58. In alternative embodiments, the movable members 52, 54 and 56 need not be concentric. The telescoping movable members may be aligned to provide a straight movement or may be configured to provide nonlinear movement, such as along a curved surface. Multiple active material components are utilized to affect the telescoping movement. An active material component 60 is connected at one end to anchor member 58 and at an opposing end to movable member 56. The active material component 60 is shown routed through an opening in a proximal face 62 of movable member 56 and connected to a distal face 64 of the movable member 56, but could alternatively be connected to the proximal face 62. Active material component 66 is connected at one end to movable member 56 and at an opposing end to movable member 54. Active material component 66 is referred to as the first active material component in the claims. The active material component 66 is shown routed through an opening in a proximal face 68 of movable member 54 and connected to a distal face 70 of the movable member 54, but could alternatively be connected to the proximal face 68. Active material component 72 is connected at one end to movable member 54 and at an opposing end to movable member 52. The active material component 72 is referred to in the claims as the actuator and as the second active material component. The active material component 72 is shown routed through an opening in a proximal face 74 of movable member 52 and connected to a distal face 76 of the movable member 52 but may alternatively be connected to the proximal face 74. End anchors 78 secure the respective ends of the active material components 60, 66 and 72 to the respective movable members and the anchor member. The anchors 78 may be crimped portions of the respective active material components or may be any material capable of restraining an end of the active material component to the respective member, such as a rubber plug, a welded joint or adhesive/epoxy bonded joint.

In FIG. 2B, three active material components 60, 66 and 72 are shown. Within the scope of the invention, additional movable members connected with additional active material components may be used. Although the active material components 60, 66 and 72 are depicted as elongated wires, they may be rods, blocks, springs or any other configuration capable of contracting upon activation. Also, within the scope of the invention, the active material components may expand, rather than contract, passively or actively, to affect fluid flow through a flow regulating valve. Finally, an active material component may consist of multiple discrete active material elements such that multiple active material elements may be connected between a pair of adjacent movable members or between the anchor member 58 and movable member 56; i.e., sets of active material components may be used. For example, an additional active material component 59 (shown in phantom) may be connected between the anchor member 58 and the movable member 56 in addition to the active material component 60. The active material elements may be in the form of wires or any other geometric shape.

It should be appreciated that, within the scope of the invention, a single active material component such as an SMA wire may be configured with different regions or segments connecting a movable member to a fixed member having different active material properties such that modulated movement of a load attached to the movable member is achieved between the movable member and the fixed member via the different regions of the single active material component actuating at different times.

In FIG. 2B, the movable members 52, 54 and 56 are shown at extreme extended positions, each not able to move any further out of the respective adjacent member due to flange-like stops 80, 82, 84 that extend from the respective movable members 52, 54 and 56, to interfere with an inner surface of the respective adjacent members at openings 86, 88, 90 in movable members 54, 56 and anchor member 58 through which the movable members 52, 54 and 56 translate, respectively. The stops 80, 82 and 84 are integrally arranged such that movement of movable member 56 to the left via contraction of active material component 60 pulls along movable members 52 and 54, and movement of movable member 54 to the left via contraction of active material component 66 pulls along movable member 52.

The active material components 60, 66 and 72 are shown in the stretched, extended state prior to activation. In the embodiment of FIG. 2B, the active material components 60, 66 and 72 are SMAs actuated at different respective temperatures which may be achieved by the temperature of the surrounding fluid or by resistive heating serving as an activation signal or trigger. The active material component 60 has the lowest Austenite start temperature, (As) followed by active material component 66 and then active material component 72 (i.e., the active material components are arranged in ascending order of Austenite start temperature (As) from the left). The transformation temperature ranges for each of the active material components 60, 66 and 72 may be completely distinct. Alternatively, the transformation temperature ranges of the active material components 60 and 66 may overlap. In this embodiment, the transformation temperature range of active material component 72 must be substantially distinct from that of active material components 60 and 66, as active material component 72 is only actively activated (e.g., by resistive heating) under certain predetermined conditions and is not intended to be passively activated by ambient temperature. Generally, the active material components that are activated by the predetermined condition (active material component 72 in this embodiment) must have a distinct higher transformation temperature range to ensure it is only activated under the set predetermined condition.

FIG. 2B contains three respective biasing springs 92, 94 and 96 acting as return mechanisms urging movable members 56, 54 and 52, respectively, to the right (against return to original shape). The biasing springs 92, 94 and 96 are optional because certain SMA materials with the reversible shape memory effect have the ability to return completely to their original shape without the application of an external restoring force. Also, a restoring force (bias) could be introduced as a load attached to the movable member 52 (or included in movable member 52). Furthermore, within the scope of the invention, a design with only one biasing spring 92 could be used. Any other arrangement that puts biasing springs in opposition to the recovery force (i.e., the contraction force) of the active material components could be used, such as arranging the biasing spring external to the movable members 60, 66 and 72 or using one biasing spring with the load for all of the active material components. Additionally, the stops 80, 82 and 84 act as overstretch prevention mechanisms as they prevent stretching of the active material components, (due to the return force of the springs 92, 94 and 96, respectively or by the reversible shape memory effect) beyond the length determined by interference of the stops 80, 82 and 84 with respective movable members 54, 56 and anchor member 58.

For purposes of illustration, in the embodiment of FIG. 2B, it is assumed that activation of active material components 60 and 66 is passively triggered by convective heating and that the active material components 60, 66 and 72 are exposed to the same surrounding temperature. As the temperature of the active material components 60, 66 and 72 increases, the transformation of active material component 60 occurs first. Consequently, movable member 56 is pulled to the left and with it, due to the stops 80 and 82, movable members 52 and 54, and therefore the load, all working against the force of biasing spring 92 (if used).

The total displacement achieved and force acting on the valve load attached to movable member 52, due to the recovery force of the active material component 60, is indicated in FIG. 2B as movement of movable member 52 from a first, start position 100 to an intermediate position 102. At the completion of the transformation of active material component 60 (or while transformation of active material component 60 is in progress if the transition temperature ranges of active material components 66 and 60 overlap), active material component 66 begins to transform, pulling with it movable members 52 and 54, and therefore the valve load. The additional displacement caused by actuation of active material component 66 is indicated in FIG. 2B by movement of movable member 52 from intermediate position 102 to intermediate position 104, referred to in the claims as a second position. Similarly as with the transformation of active material component 60, at the completion of the transformation of active material component 66 and when the predetermined condition is met, as for example, by a sensor indicating a high-acceleration maneuver, the temperature of active material component 72 is raised to its transformation temperature by resistive heating. Consequently, active material component 72 begins to transform, thereby pulling with it movable member 52 and working against the opposing force of spring 96. At the completion of the transformation of active material component 72, there is an additional displacement of the first movable member 40 (and attached load) caused by actuation of active material component 72, as indicated in FIG. 2B by movement of movable member 52 from intermediate position 104 to intermediate position 106. It should be appreciated that the active material component 72, illustrated as a single wire, could be replaced by a telescoping active material actuator so that the second stage of movement in response to occurrence of the predetermined condition could be a telescoping movement as well.

When the active material components 60 and 66 of the telescoping active material actuator assembly portion 34 are passively activated by ambient temperature to move the movable member 52 from first position 100 to second position 104, the first member 40 (shown in FIG. 2A), which is integrally attached with the movable member 52 moves a like amount of displacement so that the openings 42 are not in fluid communication with openings 44 and a solid outer portion 46 of the first member 40 is aligned with the openings 44. Thus, when the movable member 52 moves from first position 100 to second position 104 due to actuation of active material components 60 and 66, the first member 40 moves such that plane 110 through the right most portion of the right-most opening 42 moves leftward to the position where surface A is shown in FIG. 2A (surface A moves leftward a like amount). Accordingly, at the higher ambient temperature at which both active material components 60 and 66 have actuated, the flow-regulating valve 30 substantially prevents fluid flow.

The transformation temperature of the active material component 72 is selected to be above the operating temperature range of the transmission 10. Thus, it can be selectively, actively activated to actuate in a controlled manner when desired. Specifically, upon the occurrence of a predetermined condition, such as a high-acceleration turn with, the second active material component 72 of FIG. 2B is actively activated by resistive heating to actuate, moving the first movable member 40 further leftward so that slots 42A align with slots 44, thereby permitting fluid flow through the flow-regulating valve 30 during the first predetermined condition, to allow a higher level of fluid in bottom pan 20 of FIG. 1. Specifically, typical sensors (not shown) but known to those skilled in the art, relay information regarding operating conditions to the controller 32. The controller 32 processes this information, and determines whether the information indicates the existence of a predetermined condition. (For example, the controller 32 may determine that a turn with an acceleration greater than a predetermined minimum level is occurring based on steering wheel angle, vehicle speed or other information received from the sensors.) If so, the controller 32 sends an electronic control signal via control signal connector 34 to the flow-regulating valve 30, specifically, to the electrical contacts 114A, 114B of active material component 72 to activate active material component 72, causing it to actuate in a contracting manner, pulling movable member 52 to the left from second position 104 to third position 106. The integrally connected first member 40 is pulled leftward a like amount so that the additional openings 42A align with openings 44 in second member 38 and additional fluid can pass through the flow-regulating valve 30 to the bottom pan 20 (shown in FIG. 1) during the high acceleration turn. When the high g-force turn ends, the electronic control signal is no longer provided to second active material component 72, which thus cools and expands to its preactuation state, moving first member 40 back to the second position in which the solid portion 46 aligns with openings 44 of fixed second member 38, and flow through the flow-regulating valve 30 is once again substantially prevented. As an alternative to ending the control signal/resistive heating of active material component 72 when the predetermined conditions ends, the resistive heating may be controlled to end when full transformation of active material component 72 is achieved.

Additionally, flow through the valve 30 could be regulated in response to different predetermined conditions. For example, instead of being passively activated, the active material component 66 could be actively actuated in response to a sensor signal indicating that the sump 21 is sufficiently full for current operating conditions so that the first movable member 40 is more quickly moved to the left than if active material component 66 were passively activated in response to ambient temperature. The active material component 72 would still be activated in response to a high acceleration turn. Different combinations of predetermined conditions are possible. Also, different opening and closing sequences may be achieved by designing the valve with different relative spacing of slots in the different movable members.

Second Embodiment of a Flow-Regulating Valve

A second embodiment of a flow-regulating valve within the scope of the invention includes the first and second members 38 and 40 of FIG. 2A with respective openings 44, 42, 42A, as well as the telescoping active material actuator portion 34 of FIG. 2B. However, the active material component 72 is passively activated by surrounding temperature in this embodiment (rather than by resistive heating) and the activation of the three active material components 60, 66 and 72 only move first member 40 to the blocking position in which solid portion 46 of first member 40 aligns with openings 44 in fixed second member 38 to prevent fluid flow through flow-regulating valve 30. When a predetermined condition occurs, such as a high acceleration turn, a solenoid 120, rather than an active material component, acts as an actuator, and is controlled via an electronic control signal from controller 32 to push the first member 40 so that openings 42A align with openings 44 in fixed member 38, and fluid can pass through the flow-regulating valve 30. When the predetermined condition ends, the electronic control signal from the controller 32 ceases, and the solenoid 120 is returned to its initial position in which the solid portion 46 of first member 40 blocks openings 44 in fixed member 38 so that fluid can no longer flow through flow-regulating valve 30.

Third Embodiment of a Flow-Regulating Valve

Figure 3:
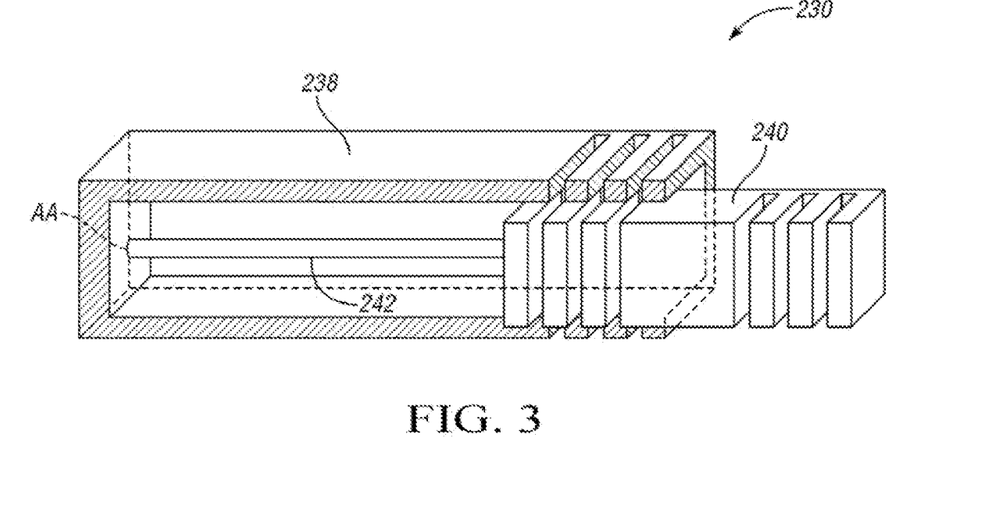
FIG. 3 is a schematic perspective illustration of a second embodiment of a flow-regulating valve within the scope of the invention.

Referring to FIG. 3, another embodiment of a flow-regulating valve 230 allows the active material actuator portion 34 of FIG. 2B to be packaged remotely from the first movable member 240 and second fixed member 238 by utilizing a connector 242 between the first movable member 240 and the active material actuator assembly portion 34, which has surfaces A in FIG. 2B connected at end AA of the connector 242. Accordingly, more flexibility in sizing of the active material actuator portion 34 is available, as it need not fit within a cavity in the fixed second member 238 as it had to fit within fixed second member 38 in the embodiment of FIG. 2B. The passive activation of the active material components 60, 66 and the active actuation of active material component 72 (i.e., the actuator) functions the same as described with respect to the first embodiment. Respective openings shown in the first member 240 and second member 238 align and misalign in response to actuation of the respective active material components, just as described with respect to the openings 42, 42A and 44 of flow-regulating valve 30 in FIG. 2A.

Fourth Embodiment of a Flow-Regulating Valve

Figure 4:
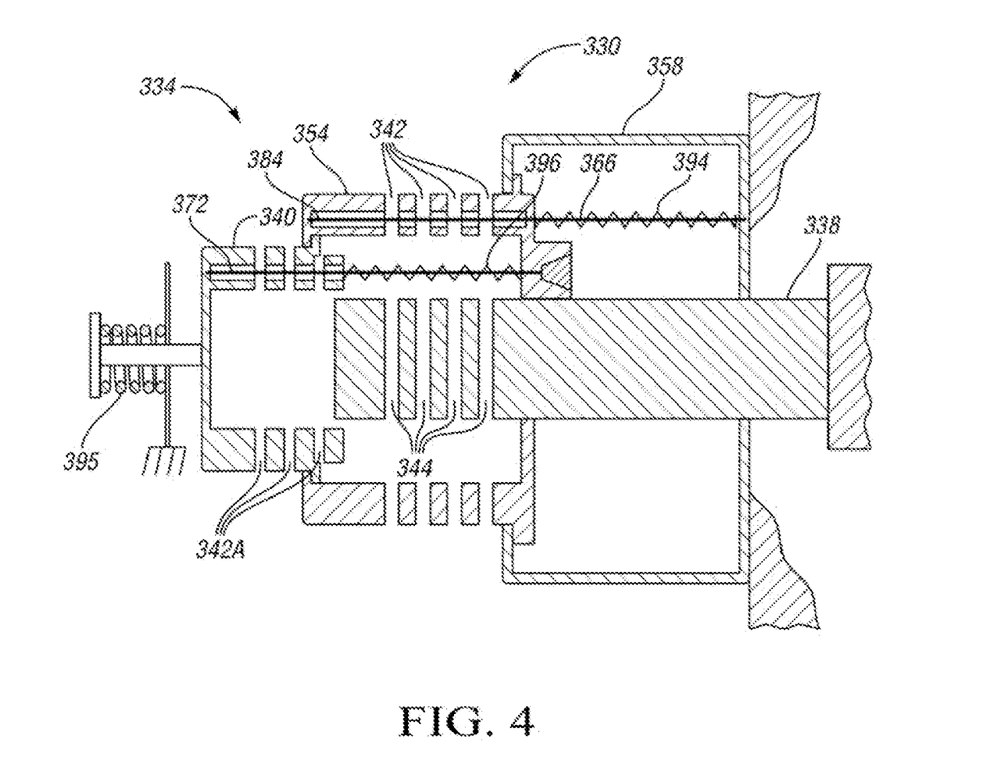
FIG. 4 is a schematic perspective illustration of a third embodiment of a flow-regulating valve within the scope of the invention.

Referring to FIG. 4, a fourth embodiment of a flow-regulating valve 330 is illustrated. In this embodiment, a telescoping active material actuator portion 334 of the valve 330 has annular, concentric movable members, each with sets of openings therein, that align and misalign with openings in a fixed member to vary fluid flow through the valve 330. Specifically, a first movable member 340 is concentrically arranged about second fixed member 338. Openings 342A extend through the first member 340. Openings 344 extend through the fixed member 338. A first active material component 366 extends between the third member 354 and a fourth fixed member 358. The active material component 366 is selected to be passively activated to actuate at a temperature within a normal transmission operating temperature range to move third member 354 to the right, so that openings 342 are no longer aligned with openings 344 in the fixed member 338. The first member 340 also moves to the right when active material component 366 actuates as stops 384 extending from movable member 340 interfere with third member 354. Thus, as temperature increases and active material component 366 actuates, movable member 340 and 354 move to the right, and no openings align with openings 344 of fixed member 338. When the temperature of the active material component 366 falls, a biasing spring 394 helps return movable member 354 to the original, unactuated position in which openings 342 are aligned with openings 344.

If however, a predetermined condition such as a high g-force turn occurs, controller 32 of FIG. 1 sends an electronic control signal to actively activate and actuate active material component 372, pulling first member 340 to the right until openings 342A align with openings 344 in fixed member 338, and flow is enabled through the flow-regulating valve 330. When the predetermined condition ends, the electronic control signal ceases, and the active material component 372 moves leftward to its preactuation position. A biasing spring 396 functions to return the first member 340 to its original, preactuation position. Additionally, a biasing spring 395 functions to return moveable member 340 to its original, preactuation position and could be used with or in place of biasing spring 396.

Thus, many different embodiments of flow-regulating valves are provided utilizing passive control (e.g., ambient temperature activation-based flow-regulation) as well as active control that fine tunes flow-regulation of the valve based on one or more predetermined conditions. In each embodiment described herein, each stage of the actuation (i.e., transitioning from open to closed) could include a series of actuations of different sets of active materials, or a single actuation of a single active material component.

While the best modes for carrying out the invention have been described in detail, those familiar with the art to which this invention relates will recognize various alternative designs and embodiments for practicing the invention within the scope of the appended claims.

The invention claimed is:

1. A flow-regulating valve comprising:
a plurality of members each having at least one different opening extending therethrough;
a first active material component operatively connected to one of said members and characterized by a first transformation temperature at which said first active material component actuates to move said one of said members, such that fluid communication between said respective different openings of said members is altered;
an actuator operatively connected to said one of said members and activatable upon occurrence of a first predetermined condition to actuate, moving said one of said members, such that fluid communication between said respective different openings of said members is further altered during said first predetermined condition; and
wherein said actuator is a second active material component that actuates in response to resistive heating.

2. The flow-regulating valve of claim 1, wherein said plurality of members includes a fixed member; and wherein said one of said members moves in telescoping relationship with respect to said fixed member.

3. The flow-regulating valve of claim 1, wherein said one of said members to which said first active material component is operatively connected is a first member; wherein said member to which said actuator is operatively connected is a second member; and wherein said first member and said second member move relative to one another in opposite directions when each is respectively actuated.

4. The flow-regulating valve of claim 1, wherein said first active material component is activatable in response to at least one additional predetermined condition to alter fluid communication between said respective openings of said members during said at least one additional predetermined condition.

5. The flow-regulating valve of claim 1, in combination with a transmission having an oil sump, and further comprising:
a controller operable to determine occurrence of said first predetermined condition and to send a control signal to activate said actuator when said first predetermined condition occurs.

6. The flow-regulating valve in combination with the transmission of claim 5, wherein the transmission includes a pump, wherein said first predetermined condition is acceleration at least a predetermined level; and wherein said flow-regulating valve opens upon receipt of said control signal so that fluid communication is increased, thereby ensuring adequate fluid and suction to said pump during said acceleration.

7. A flow-regulating valve comprising:
a plurality of members each having at least one different opening extending therethrough;
a first active material component operatively connected to one of said members and characterized by a first transformation temperature at which said first active material component actuates to move said one of said members, such that fluid communication between said respective different openings of said members is altered;
an actuator operatively connected to said one of said members and activatable upon occurrence of a first predetermined condition to actuate, moving said one of said members, such that fluid communication between said respective different openings of said members is further altered during said first predetermined condition;
wherein said actuator is a second active material component that actuates in response to resistive heating;
wherein said one of said members is a first member;
wherein said plurality of members includes a second member with respect to which said first member moves when said first active material component actuates;
wherein said plurality of members includes a third member and a fourth member that is fixed;
wherein said first active material component is operatively connected between said third member and said fourth member;
wherein said second active material component is operatively connected between said first member and said third member; wherein said third member engages said first member for movement therewith when said first active material component actuates; and
wherein said first member moves telescopically within said third member when said second active material component actuates.

8. A flow-regulating valve comprising:
a plurality of members including a first member and a second member, each having different openings extending there through;
a first active material component operatively connected to said first member and characterized by a first transformation temperature such that said first active material component actuates at said first transformation temperature to move said first member with respect to said second member from a first position to a second position, thereby varying fluid flow through said valve;
additional active material components operatively connected to said first member and to a third and a fourth member, respectively, of said plurality of members, and characterized by different respective transformation temperatures such that said first member moves in telescoping relationship to said other members; and
an actuator operatively connected to said first member and activatable upon occurrence of a first predetermined condition to actuate, moving said first member to a third position with respect to said second member, thereby further varying fluid flow through said valve during said first predetermined condition.

9. The flow-regulating valve of claim 8, wherein said actuator is a second active material component that actuates in response to resistive heating.

10. The flow-regulating valve of claim 9, wherein said first active material component is connected between said third member and said fourth member;
wherein said second active material component is operatively connected between said first member and said third member; wherein said first member is movable in telescoping relationship with respect to said third and fourth members; and wherein said third member is movable in telescoping relationship with respect to said fourth member.

11. The flow-regulating valve of claim 9, further comprising:
a connector connected with said first member and operatively connecting said first and second active material components with said first member.

12. The flow-regulating valve of claim 9, wherein said fourth member is fixed;
wherein said first active material component is operatively connected between said third member and said fourth member;
wherein said second active material component is operatively connected between said first member and said third member; wherein said third member engages said first member for movement therewith when said first active material component actuates; and
wherein said first member moves telescopically within said third member when said second active material component actuates.

13. The flow-regulating valve of claim 8, wherein said actuator is a solenoid.

* * * * *